United States Patent [19]

Müller

[11] 4,169,414

[45] Oct. 2, 1979

[54] ELECTROHYDRAULIC LOCOMOTIVE DRIVE

[75] Inventor: Helmut Müller, Heidenheim, Fed. Rep. of Germany

[73] Assignee: Voith Getreibe KG, Heidenheim, Fed. Rep. of Germany

[21] Appl. No.: 787,576

[22] Filed: Apr. 14, 1977

[30] Foreign Application Priority Data

Apr. 24, 1976 [DE] Fed. Rep. of Germany ....... 2618073

[51] Int. Cl.² .......................... B61C 3/00; B61C 9/34; B61C 9/42; B61C 15/00
[52] U.S. Cl. .................................... 105/61; 105/61.5; 105/96.2; 116/37
[58] Field of Search ....................... 105/61.5, 61, 96.2; 116/37

[56] References Cited

U.S. PATENT DOCUMENTS

| | | | |
|---|---|---|---|
| 3,065,652 | 11/1962 | Kugel et al. | 74/688 |
| 3,561,367 | 2/1971 | Black | 105/61.5 |
| 3,989,127 | 11/1976 | Staudenmaier et al. | 188/296 |

FOREIGN PATENT DOCUMENTS

1605818  5/1971  Fed. Rep. of Germany ............. 105/61

OTHER PUBLICATIONS

ZEV-Glas. Ann. 98 (1974) Nr. 7/8, Jul./Aug.; pp. 232-251 inc.
ZEV-Glas. Ann. 98 (1974) Nr. 11, Nov.; pp. 363-367 inc.
Die Bundesbahn 11/1975; pp. 687-692 inc.
Railway Gazette International, Oct. 1975; pp. 397 and 399.
ETR (24)-1975; pp. 251-259 inc. Körber, Joachim; Die Elektrischelokomotive mit Kommutaturlosen Fahrmotoren.
Der Eisenbahningenieur, 26 ( 1975) 12; Herman Wolters; Tendenzen der Enturicklung Elektrischer Triebfahrzeuge.
Analog Devices; Analog Dialogue, vol. 9, No. 2, 1975, p. 16 and advertisement.
Multifunction Converter; Burr-Brown Research Corp; Jun. 1973, Model No. 4301, 3 pages.
Very Low Drift-Precision Operational Amplifier; Model No. 3510, pp. 1 and 5 (1977), Burr, Brown Research Corp.

*Primary Examiner*—Albert J. Makay
*Assistant Examiner*—Howard Beltran
*Attorney, Agent, or Firm*—Peter K. Kontler

[57] ABSTRACT

A drive for high-speed locomotives has a variable-speed electric motor which transmits torque to the input shaft of a hydrodynamic power transmission having a hydrodynamic torque converter and a hydrodynamic coupling for transmission of torque to the output shaft which drives the wheels through the medium of a mechanical transmission and cardan shafts. The control unit of the drive engages the converter in the lowest speed range, the coupling in the highest speed range, and the coupling or the converter in the intermediate speed range. In the intermediate speed range, the coupling is engaged when the control unit ascertains that the ratio of maximum traction effort of the drive in engaged condition of the coupling at the momentary intermediate speed to the resistance which the locomotive encounters exceeds one. The resistance is ascertained automatically by determining the tractive effort of the drive in engaged condition of the converter at the momentary intermediate speed and by subtracting therefrom the accelerating force which is the product of the mass of locomotive plus cars (if any) and the momentary acceleration of the vehicle. The output shaft receives braking torque from a hydrodynamic brake whose controls include safety features to insure the application of brake in the event of failure of the primary actuating device.

19 Claims, 5 Drawing Figures

ELECTROHYDRAULIC LOCOMOTIVE DRIVE

BACKGROUND OF THE INVENTION

The present invention relates to electrohydraulic drives for vehicles, especially for locomotives. More particularly, the invention relates to improvements in drives of the type wherein a variable-speed electric motor transmits torque to a hydrodynamic power transmission which comprises a torque converter, a coupling and a hydrodynamic brake (the brake constitutes a second torque converter). The drive further comprises a control unit which automatically engages the torque converter or the coupling in such a way that the converter and the coupling are respectively operative in the lower and higher speed ranges.

The just described electrohydraulic drive exhibits many important advantages, compared with the normal electric drive actually used. Thus, and because the drive comprises a hydrodynamic brake, the dimensions of the electric motor need not be selected for operation as a generator during braking but solely for the purpose of insuring satisfactory traction. Moreover, it is possible to dispense with braking by means of the motor (i.e., the motor need not be operated as a generator) which, among other advantages, allows for deletion of braking resistors. Moreover, by engaging the torque converter during startup, the current rating (or intensity), of the motor during startup can be reduced with attendant reduction of thermal stresses upon the windings and commutator, provided that the motor embodies a commutator. This renders it possible to employ a small motor and to reduce the dimensions of the transformer, switchgear and other components.

In spite of the aforediscussed advantages of an electrohydraulic drive, such drives failed to gain acceptance in the industry. Instead of taking advantage of the aforediscussed features of drives embodying electric motors and hydrodynamic power transmissions, the manufacturers of locomotives, especially of those geared to high passenger train speeds, presently favor an entirely different approach. Replacement of the previously preferred 1-phase A.C. commutator motors or the more recent universal motors with commutator-free polyphase motors is known. This is attributable to recent developments in the electronic industry. Polyphase motors are relatively small and simple, especially owing to the omission of commutators which are subjected to extensive wear, and the tractive effort of such motors is superior to that of previously utilized motors. It has been found that a polyphase motor will furnish a high tractive effort in the lower speed range. In the higher speed range, and at a constant output, the tractive effort decreases with increasing speed. Therefore, such motors are less likely to be subjected to excessive thermal stresses, even during frequent startup. Consequently, a locomotive whose drive embodies a commutator-free polyphase motor can be used to pull high-speed passenger trains as well as extremely heavy low-speed freight trains. In other words, a locomotive drive which utilizes the just discussed motor or motors exhibits advantages which are similar to those of electrohydraulic drives; the only difference is that the hydrodynamic conversion of torque is replaced with electrical conversion of torque.

However, at the present time, the development of electronic equipment which is needed in locomotives employing drives with polyphase motors has not reached that stage which would render it possible to equip all electric locomotive drives with polyphase motors. The electronic equipment which must be used in combination with polyphase motors is extremely bulky and heavy so that the total weight of a locomotive whose drive embodies one or more polyphase motors is not substantially less than that of a locomotive whose drive employs conventional electric motors. Moreover, the cost of the electronic equipment for use with polyphase motors is prohibitive and, therefore, the decision to switch to locomotive drives which embody polyphase motors is not expected in the near future; such decision must be preceded by lengthy experimentation and testing.

The reluctance of experts in the field of locomotive drives to adopt electrohydraulic drives is attributable to the fact that an electrohydraulic drive must convert mechanical energy into fluid energy and the fluid energy back into mechanical energy. In other words, when compared with a device for direct transmission of mechanical energy, the efficiency of a hydrodynamic torque converter is relatively low. In addition, experts in the field of locomotives are reluctant to rely exclusively on a hydrodynamic brake, especially when the braking action must be supplied within the higher and maximum speed ranges. In other words, the experts are not convinced that a single dynamic brake suffices to provide the necessary safety factor during braking of a locomotive with a speed range of up to and possibly in excess of 300 km/h.

OBJECTS AND SUMMARY OF THE INVENTION

An object of the invention is to provide a novel and improved electrohydraulic drive for vehicles, especially for locomotives which are designed for use in high-speed passenger trains.

Another object of the invention is to provide an electrohydraulic drive which embodies a hydrodynamic coupling and a hydrodynamic torque converter and whose efficiency is not affected (or not unduly affected) by the fact that it embodies the converter.

A further object of the invention is to provide an electrohydraulic drive which is at least as satisfactory as the electric drive of a locomotive.

An additional object of the invention is to provide a novel and improved control unit which can be used in the above outlined drive and insures that the overall period of time during which the converter is engaged is a small fraction of the period of engagement of the coupling.

An ancillary object of the invention is to provide a drive which is constructed and assembled in such a way that eventual irregularities in RPM of the elements which transmit torque to the wheel axles of a locomotive cannot be communicated to and cannot adversely influence the motor which drives the coupling or the converter.

A further object of the invention is to provide an electrohydraulic drive which embodies a dynamic brake (preferably a hydrodynamic brake) and is provided with a novel and improved brake regulating system having safety features which insure that the brake can be engaged, when necessary, even if one or more components of the regulating system are out of commission.

An additional object of the invention is to provide the drive with a brake which is just as reliable as an electric traction motor which is operated as a generator when the operator desires to reduce the speed of the locomotive.

A further object of the invention is to provide a drive which, though sufficiently lightweight and compact to be useful in locomotives geared to high passenger train speeds, can be used with equal advantage in locomotives for low-speed transport of extremely heavy loads, such as long and fully laden freight trains.

The invention is embodied in an electrohydraulic drive for vehicles, particularly for locomotives. The drive comprises a variable-speed electric motor and a hydrodynamic power transmission having an input element which is driven by the motor, an output element which transmits motion to the wheels (e.g., by way of a mechanical power-shift transmission and one or more cardan shafts), a hydrodynamic torque converter which is engageable to transmit torque from the input element to the output element, and a coupling (preferably a hydrodynamic coupling) which is engageable to transmit torque from the input element to the output element when the converter is disengaged. The tractive effort of the drive in engaged condition of the coupling is a function of the speed of the vehicle.

The drive further comprises novel and improved control means (preferably a unit consisting of or comprising electronic components) which includes means for engaging the converter in the lowest speed range of the vehicle, means for engaging the coupling in the highest speed range of the vehicle, and means for engaging the coupling in the intermediate speed range between the lowest and highest ranges in dependency on the ratio $Z_K/F$ wherein $Z_K$ is the maximum tractive effort of the drive in engaged condition of the coupling at the momentary (then prevailing) intermediate speed and F is the resistance which the vehicle encounters to movement at such momentary intermediate speed. The ratio $Z_K/F$ is one or more than one (e.g., between 1.5 and 2) when the last mentioned engaging means engages the coupling, and the control means further comprises means for automatically determining the resistance in accordance with the equation $F = Z_W - m.b$ wherein $Z_W$ equals the tractive effort of the drive in engaged condition of the converter at the momentary intermediate speed, m is the mass of the vehicle (plus the mass of one or more cars which are hitched to the vehicle), and b is the momentary (then existing) acceleration of the vehicle.

The novel features which are considered as characteristic of the invention are set forth in particular in the appended claims. The improved drive itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
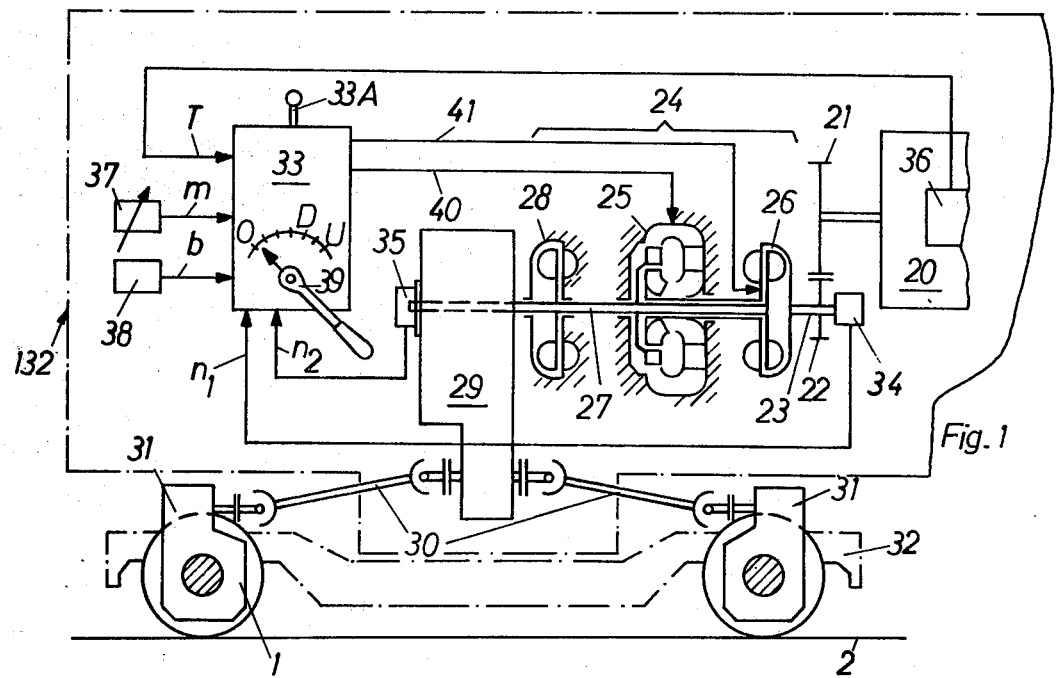
FIG. 1 is a schematic partly elevational and partly sectional view of an electrohydraulic drive which embodies the invention and is installed in a locomotive with four axles.

FIG. 1 shows an electrohydraulic drive for a locomotive whose wheels are shown at 1. The railroad track is indicated by the line 2. The drive comprises a variable-speed electric motor 20 whose output element drives a step-up gearing including mating gears 21 and 22. The gear 22 transmits torque to the input shaft 23 of a hydrodynamic power transmission 24 whose output shaft is shown at 27. The power transmission 24 comprises a hydrodynamic torque converter 25, a hydrodynamic coupling 26 and a hydrodynamic brake 28. The converter 25 is engaged in the lowest speed range (namely, during startup and, if necessary, during certain acceleration stages) or while the locomotive moves uphill. The coupling 26 is normally engaged within the remaining speed range and is invariably engaged in the highest speed range. The brake 28 is mounted on the output shaft 27 which is connected with a mechanical reversing transmission 29 whose output element transmits torque to two cardan shafts 30 for the front and rear axle differentials 31 mounted in an undercarriage or truck 32 which is shown by phantom lines. The truck 32 is turnable with respect to an upper carriage or locomotive body 132 which contains the motor 20, the power transmission 24 and the mechanical transmission 29.

The electronic control unit or switchgear for the components 25 and 26 of the power transmission 24 is shown schematically at 33. The various inputs of the control unit 33 are connected with discrete signal transmitting devices which include the following: A first velocity measuring device 34 which is a revolution counter for the RPM of the input shaft 23 and transmits a signal $n_1$ denoting the input speed (in RPM) of the power transmission 24. A second velocity measuring device 35 which is a revolution counter and transmits a signal $n_2$ denoting the output speed (in RPM) of the transmission 24 (each of the devices 34, 35 may constitute a tachometer generator). A device 36 which is associated with the motor 20 and transmits a signal T denoting the temperature of the motor windings. A signal transmitting device 37 which is adjusted before the locomotive is set in motion and transmits a signal m denoting the mass of the locomotive (plus the mass of one or more cars if the locomotive pulls a load). An acceleration meter 38 which transmits a signal b denoting the acceleration of the locomotive. An adjustable output selector or operating switch 39 for the motor 20 (for the sake of simplicity, the selector switch is shown within the box which denotes the control unit 33).

The purpose of the control unit 33 is to automatically change the ratio of the hydrodynamic power transmission 24. This unit comprises suitable electronic components for the processing of information which is transmitted to the inputs and serves to actuate or deactivate (i.e., engage or disengage) the converter 25 and coupling 26. The means for transmitting signals from a first output of the control unit 33 to the converter 25 is denoted by the line 40. The line 41 denotes the means which transmits signals from a second output of the control unit 33 to the coupling 26. It is assumed that the converter 25 and coupling 26 are of the type which can be engaged and disengaged on the principle of filling and draining, e.g., by resorting to a scoop tube. The hydraulic components which form part of the means for changing the degree of filling of the working circuits of the converter 25 and coupling 26 have been omitted for the sake of clarity.

When the locomotive is to be set in motion, the output shaft 27 receives torque from the converter 25. The situations in which the control unit 33 will switch from transmission of torque by converter 25 to transmission of torque by coupling 26 will be explained with reference to FIG. 2 wherein $Z_{KD}$ denotes the steady tractive effort of the drive when the output shaft 27 receives torque from the coupling 26 and $Z_{KU}$ denotes the tractive effort which is achieved when the coupling 26 is engaged and the motor 20 is operated at overload for a fixed interval of time (e.g., 10 minutes). The steady tractive effort which is achievable when the converter 25 is engaged is denoted by $Z_{WD}$ (in the lowermost speed range, this tractive effort is reduced to the value H which denotes the wheel adhesion force). The resistances to forward movement at different gradients are denoted by $F_a$, $F_b$ and $F_c$. The efficiency of the converter 25 when the selector switch 39 operates the motor 20 under steady load conditions (below overload) is denoted by $n_{WD}$.

Figure 2:
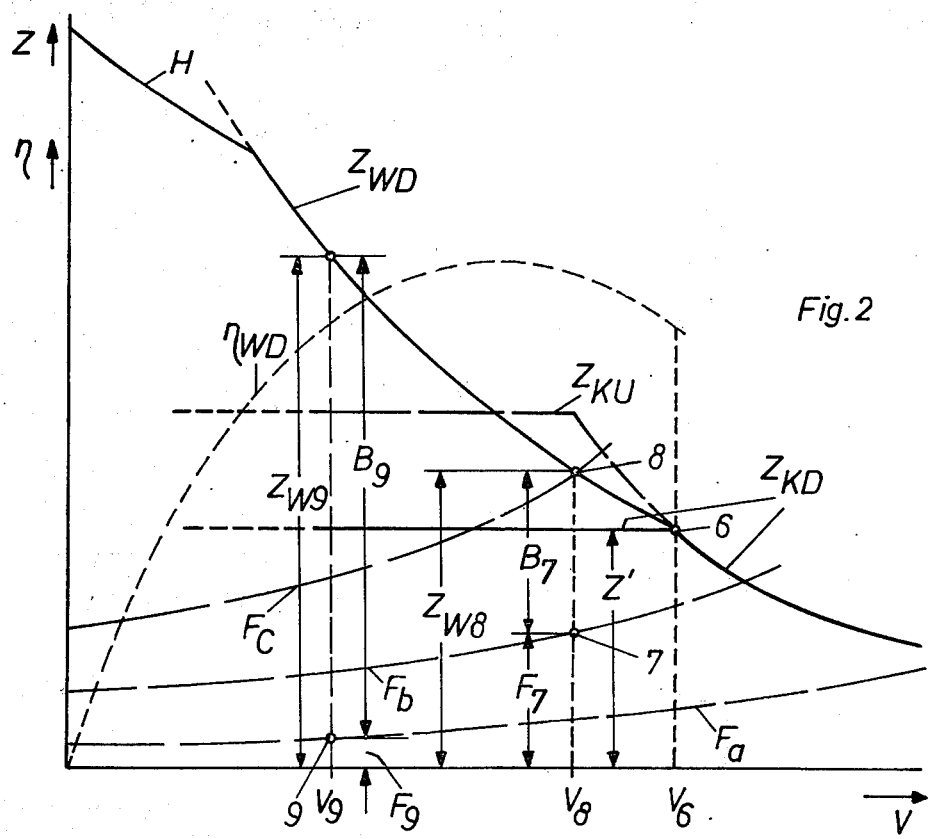
FIG. 2 is a diagram showing the dependency of efficiency and tractive effort of the drive on the speed of the locomotive.

In the diagram of FIG. 2, the speed v of the locomotive is measured along the abscissa, and the tractive effort Z (as well as the efficiency n) is measured along the ordinate. It is assumed that the locomotive encounters a resistance $F_a$. When the vehicle is set in motion and achieves the velocity $v_9$ (see the point "9" on the curve denoting the resistance $F_a$), the control unit 33 disengages the converter 25 and engages the coupling 26. The lowest speed range is between zero speed and $v_9$, the intermediate speed range is between $v_9$ and $v_6$, and the highest speed range is above $v_6$. However, the engagement of coupling 26 is not dependent solely on the momentary speed ($v_9$). Instead, the control unit 33 compares the momentary resistance ($F_9$) with that tractive effort ($Z_K$) which could be achieved, with the coupling 26 engaged, at the momentary speed v and at the momentary setting of selector switch 39. The selector switch 39 is assumed to be set at D (denoting steady load conditions); therefore, the tractive effort $Z_K$ is represented by curve $Z_{KD}$. As further the momentary speed is $v_9$, the tractive effort $Z_K$ equals $Z'$. Whether the control unit 33 will or will not engage the coupling 26 depends on the relation of the resistance $F_9$ to the tractive effort $Z'$. The engagement of coupling 26 will take place if the effort $Z'$, equals or exceeds the resistance $F_9$ by a certain value. In other words, the control unit 33 can be designed to engage the coupling 26 when the tractive effort $Z'$ which can be achieved when the coupling is engaged exceeds the momentary resistance $F_9$, i.e., if the ratio $Z'/F_9$ exceeds one by a certain value. For example, the coupling 26 will be engaged if the ratio $Z'/F_9$ equals or exceeds 1.5. If desired or necessary, the control unit 33 can select different $Z'/F$ ratios for different speeds v. For example, $Z'/F_9$ may equal two and, when the speed increases to $v_8$, the ratio $Z'/F$ may be reduced to 1.4.

In each instance, the engagement of coupling 26 must be preceded by a determination of the momentary resistance F. Such resistance equals the difference between the momentary value of tractive effort $Z_{W9}$ (with the converter 25 engaged) and the accelerating force $B_9$. The tractive effort $Z_{W9}$ can be determined on the basis of momentary speed $v_9$ and the position or setting of the selector switch 39. The accelerating force $B_9$ is the product of the mass m of the locomotive (plus the mass of one or more cars, if any) and the continuously measured acceleration b. Thus, $F_9$ equals $Z_{W9}$ minus $B_9$. The control unit 33 compares the resistance $F_9$ with the tractive effort $Z'$ which can be achieved at that speed with the coupling 26 in engaged condition. FIG. 2 shows that, in the selected example, the value of $Z'$ is a multiple of $F_9$, i.e., the control unit 33 will disengage the converter 25 and will engage the coupling 26 as soon as the speed of the locomotive rises to $v_9$.

The diagram of FIG. 2 further shows a different second situation. It is assumed that the speed of the locomotive equals $v_8$, that the selector switch 39 is set for steady load conditions (D), and that the locomotive travels uphill (see the point "8" on the curve representing the resistance $F_c$). The point "8" is located at the intersection of the curve $F_c$ with the curve $Z_{WD}$ which denotes the steady tractive effort in engaged condition of the converter 25. It will be noted that the accelerating force B is zero. The control unit 33 continuously compares the momentary resistance F (which equals $Z_{W8}$) with that tractive effort which could be achieved at the momentary (then prevailing) intermediate speed with the coupling 26 in engaged condition. The momentary resistance $F_8$ equals $Z_{W8}$ and is determined in the same way as described above, i.e., on the basis of the speed $v_8$ and the position (D) of the selector switch 39. The resistance $Z_{W8}$ exceeds the tractive effort $Z'$ which can be achieved when the coupling 26 is engaged at the speed $v_8$. Therefore, the control unit 33 insures that the output shaft 27 receives torque from the converter 25.

If the uphill gradient decreases (i.e., if the resistance decreases to $F_b$), and the speed ($v_8$) remains unchanged, the resistance $F_b$ (at the point "7") equals $F_7$. The value of $F_7$ equals the difference between the momentary tractive effort $Z_{W8}$ in engaged condition of the converter 25 and the then prevailing accelerating force $B_7$. Since the tractive effort $Z'$ exceeds $F_7$ (the ratio $Z'/F_7$ equals or approximates 1.7), the control unit 33 disengages the converter 25 and engages the coupling 26.

The control unit 33 automatically insures that the converter 25 remains disengaged when the speed reaches the threshold ($v_6$ in FIG. 2) of the highest speed range because the transmission of torque via converter would cause the drive to operate with a relatively low efficiency. The threshold of the highest speed range is preferably selected in such a way that such speed coincides with the point "6" of the curve representing the value of $Z_{KD}$, i.e., the tractive effort (with the coupling 26 engaged) begins to decrease. Inversely, when the speed v is reduced to the uppermost value (e.g., $v_9$) of the lowest speed range, the control unit 33 automatically insures that the coupling 26 remains disengaged.

The selector switch 39 can be moved to a position (U) in which the power output of the motor 20 is increased. However, the duration of such mode of operation should not exceed a relatively short period of time, e.g., 10 minutes. The control unit 33 may comprise a device (e.g., a lamp) which furnishes a readily detectable signal when the aforementioned period of time is exceeded, or the control unit 33 can be designed to automatically reset the selector switch 39 to D after elapse of the 10-minute period of overload operation of the motor 20. Otherwise, the temperature of the windings of the motor 20 would rise above the permissible maximum value.

In the drive which is shown in FIG. 1, the selector switch 39 can be moved to the position U regardless of whether the output shaft 27 receives torque from the converter 25 or from the coupling 26. However, it is desirable to design the control unit 33 in such a way that, when the motor 20 is operated in the overload range, the changeover from engagement of the coupling 26 to engagement of the converter 25 will be effected in dependency on the intensity of signal T from the monitoring device 36 (temperature of motor windings) rather than in dependency on momentary resistance F and the maximum achievable tractive effort at a particular speed (with the coupling 26 engaged).

It is assumed that the coupling 26 is engaged and the selector switch 39 is moved to the position U because the locomotive travels uphill or because the operator wishes to accelerate the locomotive. The changeover to engagement of the converter 25 can be effected in any one of several ways. For example, the converter 25 will be engaged in automatic response to elapse of the 10-minute interval of operation under overload conditions, and such engagement can take place simultaneously with adjustment of the motor 20 for operation below peak load. Alternatively, the converter 25 can be engaged in automatic response to heating of motor windings to a preselected maximum permissible temperature (i.e., when the intensity of the signal T reaches a preselected value). The signal T whose intensity suffices to cause the control unit 33 to engage the converter 25 can also serve to effect automatic adjustment of the motor 20 for operation below overload conditions. Still further, the control unit 33 can comprise means for automatically resetting the motor 20 for operation under overload conditions as soon as the temperature of the windings drops below a given value, and the resetting can take place simultaneously with engagement of the coupling 26 (such mode of operation of the control unit 33 presupposes that the selector switch 39 remains in the position U during cooling of the motor windings).

Referring again to FIG. 2, it will be noted that the converter 25 can be designed with a view to insure that the curve representing $Z_{WD}$ meets the curve representing $Z_{KD}$ at the point "6" (i.e., at that speed of the locomotive at which the control unit 33 automatically disengages the converter 25 and engages the coupling 26).

An important feature of the improved power transmission 24 is that, whenever possible, the output shaft 27 receives torque from the coupling 26, i.e., that the converter 25 (whose efficiency is lower) is engaged only when necessary, namely primarily during startup. In presently known hydrodynamic power transmissions, the coupling is engaged only when the speed v rises to a value at which the curve representing the efficiency of the converter begins to slope downwardly. On the other hand, and as explained in connection with FIG. 2, the control unit 33 engages (or can engage) the coupling 26 before the just mentioned curve begins to slope downwardly. In other words, the operation of the improved power transmission departs from the conventional mode of operation according to which one engages the coupling only when the ratio of the turbine RPM to the pump RPM of the converter (i.e., the speed of the output shaft) reaches a predetermined value. As also mentioned above, the control unit 33 engages the converter 25 during startup (in the lowest speed range) and engages the coupling 26 as soon as a comparison between the resistance F and the tractive effort Z' (namely, the tractive effort in engaged condition of the coupling 26 at a given speed v) reveals that the value of Z' exceeds the value of F. Such comparison can be readily effected by resorting to well known electronic components, preferably to components which can furnish output signals representing the quotient of input signals denoting the momentary values of Z' and F. The timing of switchover from engagement of the converter 25 to engagement of the coupling 26 can be selected practically at will, e.g., when the ratio Z'/F equals one or exceeds one (e.g., 1.5:1). The magnitude of available accelerating force B increases proportionally with increasing value of the ratio Z'/F. It can be seen that, in comparison with conventional hydrodynamic power transmissions which also employ a converter and a coupling, the improved power transmission insures that the periods of torque transmission by converter 25 are reduced to a minimum, i.e., such periods are sufficiently short to insure that, for all practical purposes, the effect of the relatively low efficiency of the converter 25 upon the overall efficiency of the power transmission is negligible.

The switching from engagement of the coupling 26 to engagement of the converter 25 can be effected in an analogous manner, i.e., by comparing the maximum attainable tractive effort in engaged condition of the coupling with the resistance and by engaging the converter 25 when the ratio Z'/F is reduced below a given value. However, and as described in connection with FIG. 2, the operation can be simplified by causing the control unit 33 to engage the converter 25 as soon as the speed v decreases to the upper limit ($v_9$ in FIG. 2) of the lowest speed range. Moreover, and if the selector switch 39 is set for motor operation at overload, the converter 25 can be engaged in response to a signal other than that denoting the speed v, i.e., in response to a given intensity of the signal T which denotes the temperature of the motor windings. Such mode of operation also insures that the overall period of engagement of the converter 25 is reduced to a minimum, i.e., that the coupling 26 remains engaged even at such times when the required tractive effort is very high. This is achieved by the simple expedient of changing the setting of the selector switch 39 (to U). As mentioned before, the engagement of converter 25 (while the pointer of the selector switch 39 registers with the graduation U) preferably takes place simultaneously with an adjustment of the motor 20 from operation at overload to operation under steady or part load.

It will be seen that the timing of shifting from engagement of the converter 25 to engagement of the coupling 26 can be made dependent on a first set of parameters (ratio $Z_K/F$) when the motor 20 is adjusted for operation at partial or rated load, and that such timing is different when the motor is adjusted to operate at overload. In the latter case, the parameter which determines the timing of shift from engagement of the converter 25 to engagement of the coupling 26 is the ability of the motor 20 to withstand thermal stresses. In actual practice, this means that one can switch to engagement of the coupling 26 as soon as the temperature of motor windings drops to or below a preselected value. Consequently, the coupling 26 can be engaged at times when the locomotive pulls an extremely heavy load and travels along a very long upwardly inclined stretch of the tracks 2. The control unit 33 engages the coupling 26 whenever the intensity of signal T is reduced below a given value so that, instead of engaging the converter 25 during the entire interval of uphill travel of a large mass (e.g., a long freight train), the converter is engaged alternatively with the coupling to thus improve the efficiency of the drive. Of course, and as explained in connection with FIG. 2, the engagement of converter 25, while the pointer of the selector switch 39 registers with the graduation U, preferably takes place simultaneously with (i.e., in automatic response to) adjustment of the motor 20 for operation other than at overload so as to allow for rapid cooling of the windings. The motor 20 is automatically adjusted for operation at overload as soon as the coupling 26 is reengaged. Such repeated engagement and disengagement of the coupling 26 during operation at overload has been found to significantly improve the overall efficiency of the drive without causing pronounced fluctuations of the tractive effort. The number of changeovers from engagement of converter 25 to engagement of the coupling 26 and vice versa depends on the length of the uphill gradient.

Another important advantage of the improved drive is that the combined weight of its parts is surprisingly low. This renders the drive especially suitable for use in locomotives which are geared to high passenger train speeds (e.g., up to and even in excess of 300 km/h).

Figure 3:
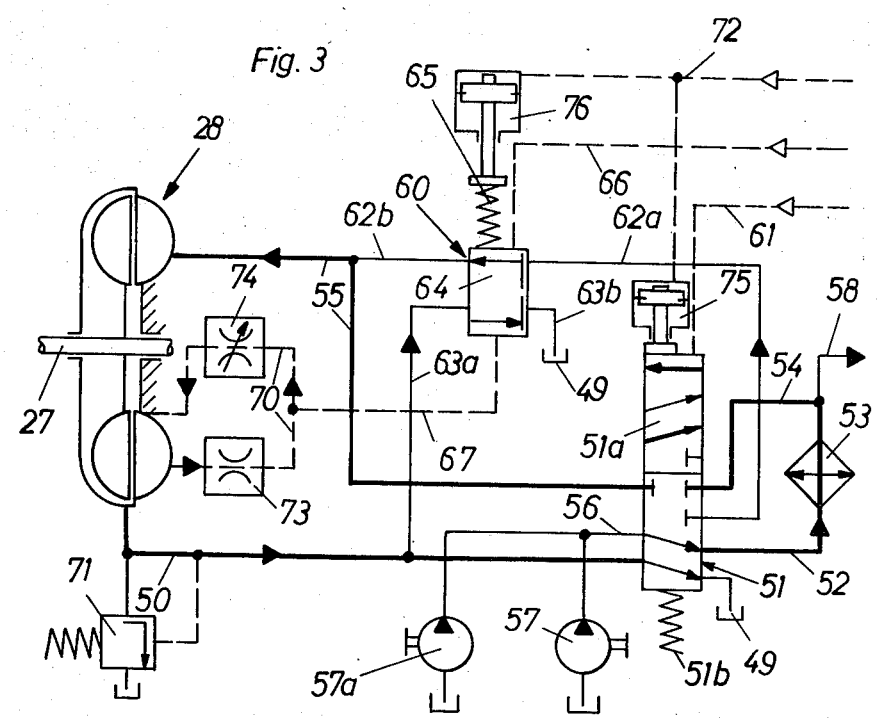
FIG. 3 is a schematic view of a regulating system for the hydrodynamic brake in the drive of FIG. 1.

FIG. 3 illustrates the control system or regulating system for the hydrodynamic brake 28 of the power transmission 24. This regulating system is somewhat similar to that which is disclosed in U.S. Pat. No. 3,989,127. The cooling circuit for the working fluid of the brake 28 comprises a return line 50, a starting valve 51, a line 52, a heat exchanger (cooler) 53, a further line 54, and a supply line 55 for cooled working fluid.

The valving element 51a of the starting valve 51 is biased by a spring 51b and tends to assume the "off" position which is shown in FIG. 3. The valving element 51a is on when it moves downwardly, as viewed in FIG. 3, i.e., against the opposition of the spring 51b. The movement of valving element 51a to the "on" position takes place when the valve 51 receives a signal to actuate the brake 28. For example, such signal can be transmitted by pressurized fluid (e.g., air) in a control pipe 61. When the valving element 51a assumes the illustrated ("off") position, the line 50 communicates with the sump 49; at the same time, the valve 51 seals the line 54 from the line 55.

The shafts 23 and 27 of the power transmission 24 respectively drive the pumps 57 and 57a which draw working fluid from the sump 49 and deliver pressurized fluid to a common supply conduit 56. When the valving element 51a of the valve 51 is in the "off" position, the conduit 56 communicates with the line 52 so that the pressurized fluid is cooled at 53. The line 54 has a branch 58 which supplies cooled working fluid to the chamber of the converter 25 or coupling 26 when the brake 28 is idle. When the valve 51 receives a signal via pipe 61 to move the valving element 51a to the "on" position, working fluid circulates along a closed path defined by the pipes 50, 52, 54, 55, valve 51 and cooler 53, i.e., the fluid flows to the working chamber of the brake 28 (via pipe 55) and from the working chamber of the brake back to the cooler 53.

The supply conduit 56 for pressurized fluid is further connected with a conduit 62a, 62b when the valving element 51a of the starting valve 51 is in the "on" position. The conduit portion 62b communicates with the line 55 or directly with the working chamber or circuit of the brake 28. FIG. 3 further shows an evacuating conduit 63a, 63b which can connect the line 50 with the sump 49. A regulating valve 60 is installed between the conduit portions 62a, 63a and 62b, 63b. This valve constitutes a means for changing the degree of filling of the working chamber of the brake 28 and hence the magnitude of the braking torque. The valving element 64 of the valve 60 is biased by a spring 65 which tends to maintain the element 64 in the illustrated position, i.e., the portions 62a, 62b are free to communicate with each other but the portion 63a is sealed from the sump 49. The valving element 64 is further movable to the illustrated position under the action of pressurized fluid (e.g., compressed air) which is admitted via conduit 66 and whose (reference) pressure can be varied at will. The fluid which is admitted via conduit 66 acts against the upper end face of the valving element 64 (which may constitute a reciprocable piston or spool). The other (lower) end face of the valving element 64 can be subjected to the pressure of fluid which is admitted via conduit 67 whose pressure is indicative of pressure in the working chamber of the brake 28. To this end, the inlet of the conduit 67 communicates with a loop 70 which includes a portion of the working chamber of the brake 28 and contains two flow restrictors 73 and 74. At least one of these flow restrictors is preferably adjustable (see the flow restrictor 74). A pressure which is indicative of fluid pressure in the working chamber of the brake 28 prevails in the loop 70 upstream of the flow restrictor 74 and downstream of the flow restrictor 73.

The system of FIG. 3 further comprises a pressure relief valve 71 which connects the line 50 with the sump when the pressure of fluid in the working circuit of the brake 28 reaches a maximum permissible value. In other words, the setting of the relief value 71 determines the maximum value of the braking torque.

The system of FIG. 3 is constructed and assembled in such a way that the brake 28 can be applied even in the event of malfunction of the valve 51 and/or 60 in the first or primary actuating unit. To this end, the valves 51 and 60 are respectively associated with fluid-operated auxiliary actuating motors 75 and 76 which respond to emergency signals (pressure in a conduit 72). When the auxiliary motor 75 is operated in response to transmission of an emergency signal via conduit 72, the valving element 51a of the valve 51 is moved to the "on" position to connect the line 54 with the line 55. The emergency signal which is transmitted via conduit 72 actuates the auxiliary motor 76 to move the valving element 64 to the illustrated end position in which the valving element 64 offers no resistance to the flow of fluid from the conduit portion 62a into the conduit portion 62b. Thus, the brake 28 can apply the maximum braking torque (which is determined by setting of the pressure relief valve 71).

The motors 75, 76 can be replaced by electromagnets or other suitable auxiliary actuating means.

Figure 4:
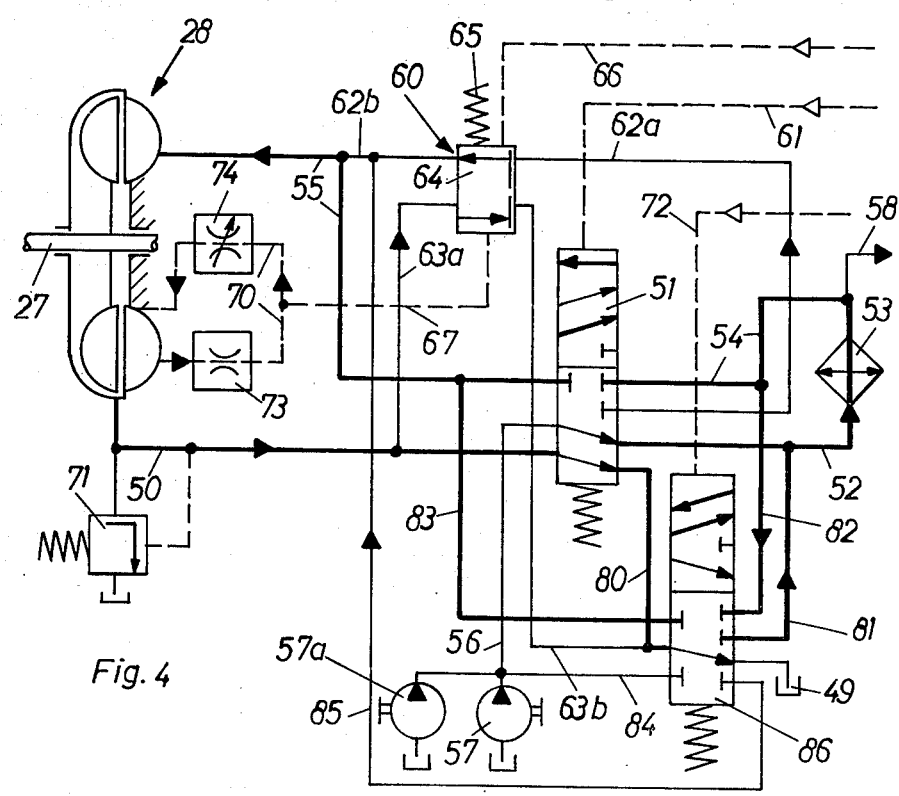
FIG. 4 is a diagrammatic view of a modified regulating system for the brake.

FIG. 4 shows a modified regulating system which comprises different auxiliary features for the application of hydrodynamic brake 28. The system of FIG. 4 comprises auxiliary lines 80, 81 and 82, 83 which bypass the starting valve 51, and auxiliary conduits 84, 85 which bypass the valve 60. An auxiliary starting valve 86 has a valving element whose position changes in response to transmission of an emergency signal via conduit 72 to thereby connect the conduit 56 (i.e., the outlets of the pumps 57 and 57a) directly with the working chamber of the brake 28 via conduits 84 and 85. This insures rapid filling of the chamber with working fluid. At the same time, the valving element of the valve 86 connects the lines 80, 81 with the lines 82, 83 to thus complete the auxiliary cooling circuit.

The regulating systems of FIGS. 3 and 4 insure that the brake 28 can furnish satisfactory braking torque even if the locomotive which embodies the drive of FIG. 1 is designed for speeds in the range of 300 km/h. The safety or auxiliary features of the regulating system guarantee the application of brake 28 even in the event of malfunctioning or total breakdown of one or more important primary elements (51, 60) of the system. All that is necessary is that the operator transmit an emergency signal (via conduit 72). The brake 28 and the regulating system of FIG. 3 or 4 can be used with equal advantage in locomotives whose drives do not embody a hydrodynamic power transmission, notwithstanding the presently prevailing preference for braking with electric motors by causing such motors to operate as generators. Such preference is attributable to the fact that, in many locomotives which employ electric motors, the motors are mounted on the undercarriage in immediate proximity to the axles so that the paths for transmission of driving or braking torque from the motors to the respective axles are short and simple. In such conventional drives, the transmission of torque from the electric motors to the axles can take place by way of simple spur gear trains. On the other hand, the transmission of torque from the output element of a hydrodynamic power transmission to the wheel axles normally necessitates the utilization of cardan shafts.

It has been found that the prejudice against the utilization of braking means which employs only a hydrodynamic brake is not justified, especially in locomotives which are geared to high passenger train speeds (this is the presently preferred application of the improved drive). This is due to the fact that, in such locomotives, one strives to reduce the nominal load on the axles as well as to employ a lightweight undercarriage (the reasons for this will be readily understood by persons skilled in the art). Consequently, and assuming that the high-speed locomotive is equipped with a conventional electric drive, the electric motors cannot be mounted in the undercarriage because this would increase the mass of the undercarriage well above the permissible value, i.e., the motors must be mounted in the upper carriage or body of the locomotive and the transmission of torque must take place by way of cardan shafts or analogous articulated torque transmitting means. Consequently, braking with the motors in a locomotive wherein the motors are installed in a part other than the undercarriage is not safer than the braking in a manner as described in connection with FIGS. 3 and 4. In fact, the hydrodynamic brake 28 exhibits an important advantage over the just described brakes for use in high-speed electrical locomotive drives because the mechanical parts of a hydrodynamic brake can be dimensioned to withstand breakage with the same safety factor as the wheels, axles and/or axle gearings of a locomotive.

The engagement of brake 28 automatically entails automatic disengagement of the converter 25 or coupling 26. The corresponding actuating element is shown in FIG. 1, as at 33A. Thus, when the operator of the locomotive decides to engage the brake 28 by way of the element 33A, the connection 40 or 41 automatically transmits a signal for evacuation of working fluid from the chamber of the converter 25 or coupling 26. This is desirable and advantageous because the brake 28 can be applied without necessitating any braking of the motor 20 whose mass (compared to the overall mass of the locomotive) is rather substantial.

The regulating system of FIG. 3 or 4 could be replaced with a system employing dual operating means for the brake 28. However, it has been found that such dual controls are not necessary if the regulating system is constructed in a manner as shown in FIG. 3 or 4 because the auxiliary or safety features of the illustrated systems are amply sufficient to insure timely application of the brake 28, even in the event of serious malfunction or complete breakdown of the primary actuating means including valve 51 and/or the valve 60.

The preceding discussion proves the advantages of a hydrodynamic power transmission which is designed for use in high-speed locomotives and which is installed in the main body or upper carriage 132 of the vehicle and is coupled to the axle differentials by means of cardan shafts or the like. Though such mounting of the power transmission is suggested in U.S. Pat. No. 3,065,652, the patented transmission is not designed for operation at speeds within the aforementioned range of up to and in excess of 300 km/h. Moreover, by installing the improved (lightweight and compact) drive in the body 132 of the locomotive, the total mass of the locomotive and the mass of its undercarriage 32 can be reduced to a surprisingly low value. Such drive is superior to presently known drives and the braking action of its brake is not inferior to the action of braking devices which are used in heretofore known locomotives.

To summarize, the surprisingly low weight and compactness of a locomotive which embodies the improved drive are attributable to one or more of the following factors: The drive employs one or more relatively small and compact electric motors, transformers and switch-gears because the current rating of such parts can be selected for operation under steady or partial load conditions and, if necessary, for operation under overload for relatively short intervals of time. Such current rating (especially since the overload need not be pronounced) is a relatively small fraction of current ratings of conventional electrical drives for locomotives wherein the rating must be selected with a view to insure satisfactory acceleration as well as a satisfactory braking action. Moreover, the RPM of the output shaft of the electric motor 20 necessitates adjustment within a relatively narrow range (a ratio of 1:2 or 1:1.8 has been found to be quite satisfactory). The improved drive can dispense with the braking resistors of electrical drives; this, in turn, renders it possible to improve the design of the vehicle body from the aerodynamic standpoint, i.e., to reduce the resistance F and to thus further reduce the output of the motor 20. Moreover, the improved drive can employ one or more relatively simple, inexpensive, compact and reliable 1-phase commutator motors which, in turn, allows for simplification of the electronic controls. However, it is equally within the purview of the invention to use a commutator-free polyphase motor.

Another advantage of the improved drive is that, owing to hydrodynamic torque conversion, repeated startup, acceleration and/or braking cannot adversely influence the energy supply. In other words, the power factor is satisfactory under any and all operating conditions. Moreover, eventual short circuits, accompanied by abnormally high torque transmission, cannot cause any damage (or any serious damage) to the drive. All in all, a vehicle embodying the improved drive exhibits all advantages of locomotives with electrical drives employing commutator-free multiphase current motors and complex electronic control circuitry. Such advantages include satisfactory tractive effort, minimal or negligible thermal stressing of the motors as well as pronounced versatility, i.e., the ability of the locomotive to serve for transport of freight or for high-speed transport of passengers.

The utilization of an electric motor as a means for transmitting torque to a mechanical step-down transmission whose output element transmits torque to the wheel axle through the medium of a cardan shaft is known. Such construction exhibits the drawback that the unavoidable absence of uniformity in rotation of the median portion of the cardan shaft reduces the coefficient of static friction between the wheels and the tracks. This is due to the fact that the electric motor (whose moment of inertia is high) cannot rotate relative to the cardan shaft so that the aforementioned absence of uniformity of rotation of the median portion of the cardan shaft is communicated to the motor. The improved drive eliminates this problem because the hydrodynamic power transmission 24 does not transmit eventual irregularities in the speed of cardan shafts 30 to the output element of the motor 20.

The improved drive is susceptible of many additional modifications without departing from the spirit of the invention. For example, the temperature monitoring device 36 of FIG. 1 can be replaced with a device which monitors the energy requirements of the motor 20 and cooperates with a suitable timer to transmit a signal (in place of the signal T) when the interval of operation under overload reaches a preselected value (e.g., 10 minutes). The control unit 33 then automatically engages the converter 25 and reduces the energy requirements of the motor 20.

Figure 5:
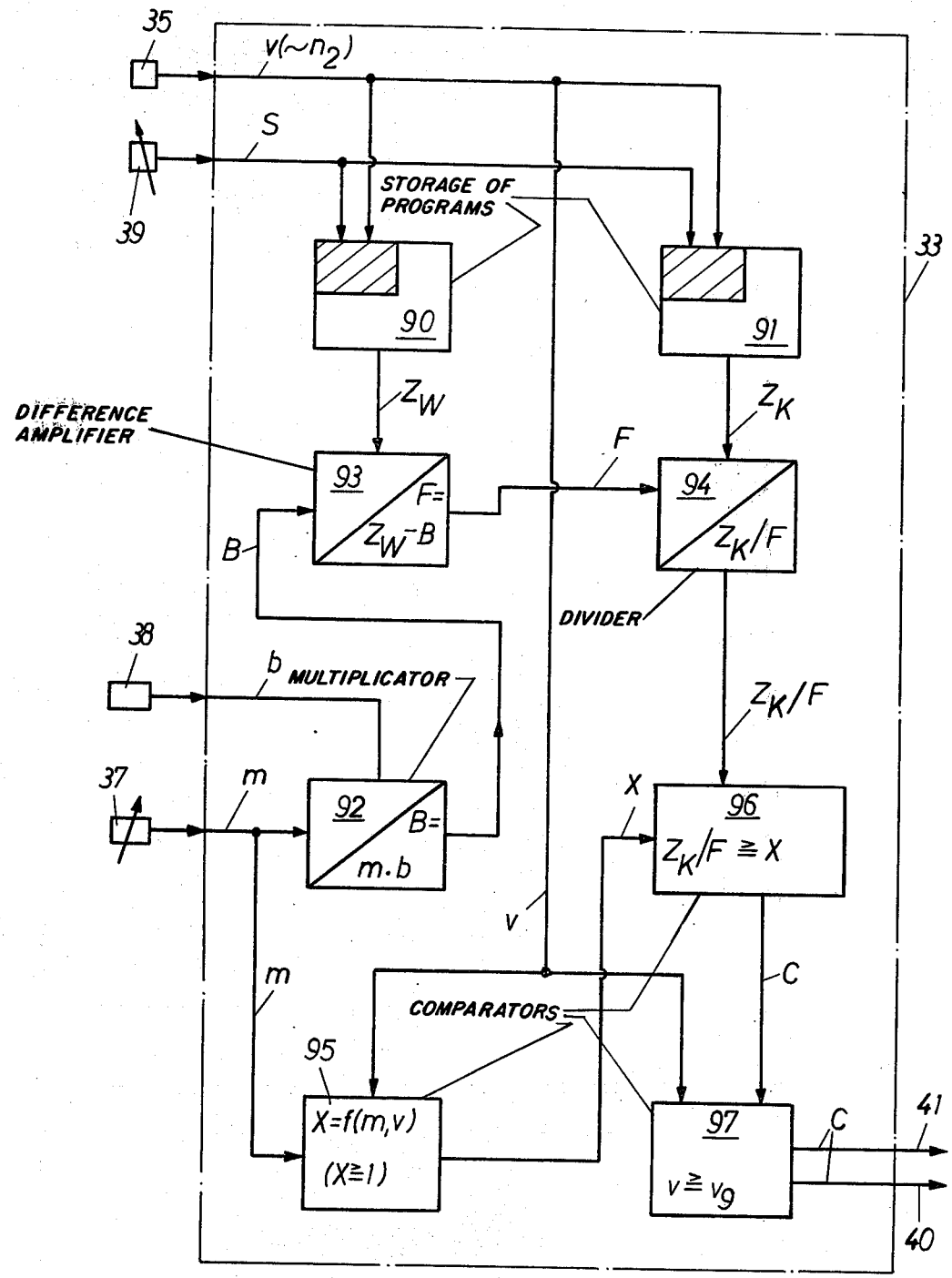
FIG. 5 is a schematic view of some details of the control unit in the drive of FIG. 1.

FIG. 5 is a schematic view of some details of the electronic control unit 33. The symbols 90, 91, 92, 93, 94, 95, 96 and 97 denote those electronic components being necessary for the changeover to engagement of coupling 26 in dependency on the ratio $Z_K/F$.

As explained above with reference to FIG. 1, the inputs of the control unit 33 are connected to the signal transmitting devices 35, 39, 38 and 37 transmitting, respectively, the RPM of the output shaft 27 (and thus the speed v of the locomotive), the setting S of the selector switch 39, the acceleration b and the mass m of the locomotive (plus the mass of cars if any).

The signals v and s are transmitted to the components 90 and 91. In the component 90 programs are stored representing the dependency of the tractive effort $Z_W$ (which is achievable when the converter 25 is engaged) on the speed v at different settings S of the selector switch 39. Thus the component 90 transmits a signal representing the momentary tractive effort $Z_W$. In the same manner the component 91 produces a signal representing the momentary tractive effort $Z_K$ which is achievable when the coupling 26 is engaged.

The component 92 is a multiplicator (e.g., of the type known as model 4301 produced by Burr-Brown) which forms the product of the mass m and the momentary acceleration b. That product which is the momentary acceleration force B and the signal $Z_W$ are transmitted to the component 93 (e.g., a difference amplifier of the type known as 3510 produced by Burr-Brown) which forms the difference $Z_W$ minus B representing the momentary resistance F.

The component 94 (e.g., a divider known as model 4301 produced by Burr-Brown) receives the signals $Z_K$ and F and produces therefrom a signal representing the ratio $Z_K/F$. The component 95 forms a reference value X, being dependent on the speed v and/or the mass m (or on any other signal).

The signal $Z_K/F$ and the reference value X are transmitted to the component 96 which is a comparator (e.g., of the type AD111/211/311 produced by Analog Devices. It transmits only then a signal C (which represents a command for changeover to engagement of coupling 26) to the component 97 when $Z_K/F$ equals or exceeds X. Finally, the component 97 transmits the signal C only then to the converter 25 and to the coupling 26 when the speed v is at least equal to $V_9$.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. An electrohydraulic drive for vehicles, particularly for locomotives, comprising a variable-speed electric motor; a hydrodynamic power transmission including an input element driven by said motor, an output element, a hydrodynamic torque converter engageable to transmit torque from said input element to said output element and a coupling engageable to transmit torque from said input element to said output element when said converter is disengaged; adjustable means for operating said motor at different loads, the tractive effort of said drive in engaged condition of said coupling during operating conditions including the speed of the vehicle and the setting of said adjustable means; and control means including means for engaging said coverter in a low speed range of the vehicle, means for engaging said coupling in a high speed range, said high and low speed ranges overlapping in an intermediate speed range wherein either said converter or said coupling is engageable, and means for initiating a changeover to engagement of said coupling in said intermediate speed range comprising a first component for generating a first signal denoting the momentary acceleration force, a second component for generating a second signal denoting the difference between the momentary tractive effort of the drive in engaged condition of said converter said momentary acceleration force, signal comparing means for generating a third signal denoting the ratio of tractive effort of the drive in engaged condition of said coupling at the momentary operating conditions to said second signal, and comparator means for generating a fourth signal when said ratio at least equals unity, said fourth signal initiating said changeover.

2. A drive as defined in claim 1, wherein said coupling is a hydrodynamic coupling.

3. A drive for vehicles as defined in claim 1, having a wheel-mounted undercarriage and an upper carriage movably supported by said undercarriage, wherein said motor and said power transmission are installed in said upper carriage and further comprising means for transmitting torque from said output element to the wheels for said undercarriage, said torque transmitting means including at least one cardan shaft.

4. A drive as defined in claim 1, further comprising adjustable means for operating said motor at different loads, said control means further including means for determining the tractive effort of the drive including means for measuring the speed of the vehicle, the tractive effort being related to the speed and the setting of said operating means and said control means further including means for monitoring the acceleration of the vehicle.

5. A drive as defined in claim 1, further comprising means for operating said motor at different loads including overload whereby said motor is subjected to progressively increasing thermal stresses during operation at overload in engaged condition of said coupling, said control means further comprising means for engaging said converter in automatic response to elapse of a preselected interval of time during which said motor is operated at overload in engaged condition of said coupling.

6. A drive as defined in claim 1, further comprising a dynamic brake for said output element and means for applying said brake, said control means further including means for disengaging said converter and said coupling, whichever is engaged when the need for braking torque arises, in response to application of said brake.

7. A drive as defined in claim 1, further comprising means for operating said motor at overload in engaged condition of said coupling whereby the motor is subjected to progressively increasing thermal stresses, said control means further comprising means for monitoring said stresses at least within said intermediate speed range and for disengaging said coupling, for engaging said converter and for reducing the load upon said motor when the magnitude of said stresses reaches a predetermined maximum value.

8. A drive as defined in claim 7, wherein said control means further includes means for automatically reengaging said coupling when the magnitude of said thermal stresses decreases to a predetermined second value.

9. A drive as defined in claim 7, wherein said motor includes windings and said monitoring means includes means for measuring the temperature of said windings.

10. A drive as defined in claim 1, further comprising a single dynamic brake for said output element, said brake constituting a hydrodynamic brake having a working chamber for working fluid, and further comprising means for changing the degree of filling of said chamber with fluid and for thereby changing the braking torque, first actuating means for said changing means, auxiliary actuating means for said changing means, and means for transmitting to said auxiliary actuating means emergency signals in the event of failure of said first actuating means.

11. A drive as defined in claim 10, wherein said changing means comprises a first valve and further comprising a relief value arranged to open a path for evacuation of fluid from said chamber when the pressure of fluid in said chamber rises to a predetermined value.

12. A drive as defined in claim 10, wherein said changing means comprises an adjustable first valve and said auxiliary actuating means includes means for adjusting said valve to admit to said chamber working fluid at a maximum rate in response to transmission of an emergency signal.

13. A drive as defined in claim 12, wherein said adjusting means comprises a fluid-operated motor.

14. A drive as defined in claim 12, wherein said adjusting means comprises an electromagnet.

15. A drive as defined in claim 10, wherein said first actuating means comprises a starter valve having a valving element movable between first and second positions in which said valve respectively admits and interrupts the admission of fluid to said changing means, said auxiliary actuating means including means for moving said element to said first position in response to transmission of an emergency signal.

16. A drive as defined in claim 15, wherein said moving means comprises a fluid-operated motor.

17. A drive as defined in claim 15, wherein said moving means comprises an electromagnet.

18. A drive as defined in claim 10, further comprising means for cooling the working fluid, means for conveying heated working fluid from said chamber to said cooling means, and means for conveying cooled fluid from said cooling means to said chamber, said first actuating means including a first valve in said conveying means and said auxiliary actuating means including additional means for conveying fluid from said chamber to said cooling means and back to said chamber, a normally closed second valve in said additional cooling means, and means for opening said second valve in response to transmission of an emergency signal.

19. A drive as defined in claim 18, wherein said changing means comprises an adjustable third valve and said auxiliary actuating means further comprises means for admitting fluid into said chamber independently of said third valve in response to opening of said second valve.

* * * * *